April 21, 1925.

L. A. ZOHE

MILKING VESSEL

Filed May 16, 1922

Ludwig Alwin Zohe INVENTOR.

BY

Parsons & Bodell ATTORNEYS.

April 21, 1925.
L. A. ZOHE
MILKING VESSEL
Filed May 16, 1922
1,534,628
2 Sheets-Sheet 2
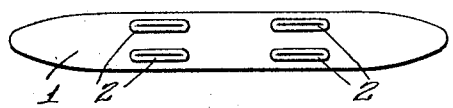
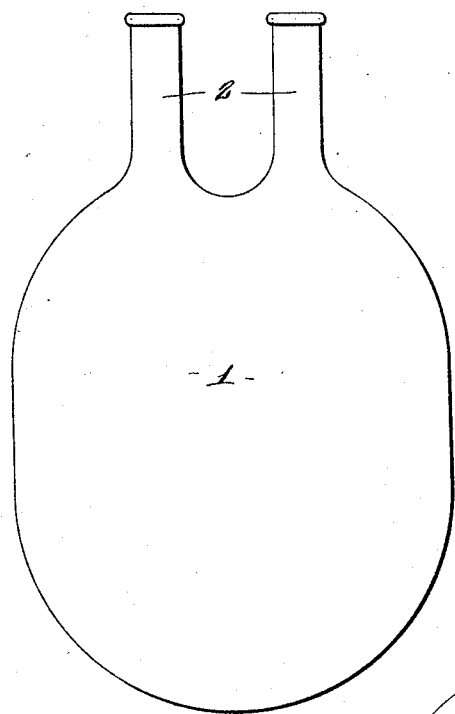
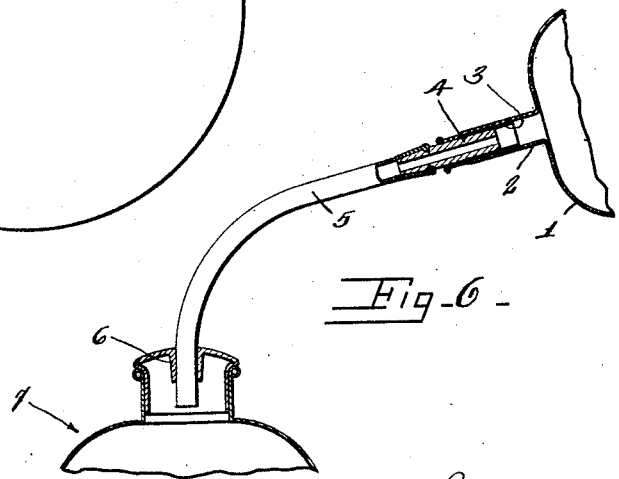
INVENTOR.
BY
ATTORNEYS.

Patented Apr. 21, 1925.

1,534,628

UNITED STATES PATENT OFFICE.

LUDWIG ALVINE ZOHE, OF SYRACUSE, NEW YORK.

MILKING VESSEL.

Application filed May 16, 1922. Serial No. 561,403.

*To all whom it may concern:*

Be it known that I, LUDWIG ALVINE ZOHE, a citizen of the United States, and a resident of Syracuse, in the county of Onondaga and State of New York, have invented a certain new and useful Milking Vessel, of which the following is a specification.

This invention has for its object a milking vessel whereby the milk is discharged from the udder of the animal into a flexible, collapsible container so that the milk enters a space comparatively free of air and without coming in contact with the outer air.

The invention consists in the novel features and in the combinations and constructions hereinafter set forth and claimed.

In describing this invention, reference is had to the accompanying drawing, in which like numerals indicate corresponding parts in all the views.

Figure 3 is a detail view of the closure for the neck of the vessel.

Figures 4 and 5 are respectively an elevation and a plan view of another form of collapsible vessel.

Figure 6 is a detail view showing the method of emptying the vessel into a larger container without permitting the milk to come in contact with the outer air.

Figure 1:
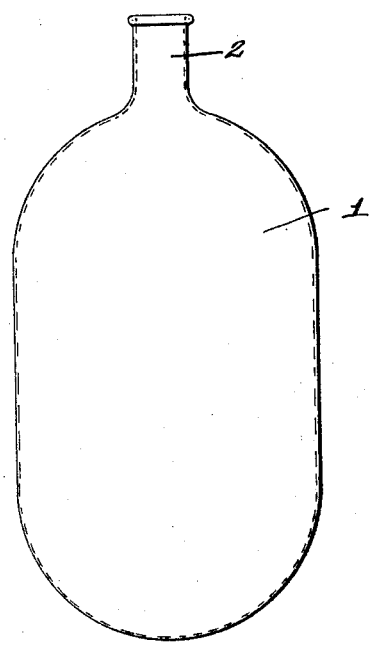
Figure 1 is an elevation of one form of milking vessel.
Figure 2:
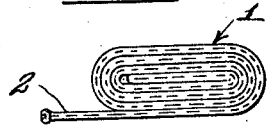
Figure 2 is a side elevation showing one way of collapsing the vessel.

This milking vessel comprises a collapsible, flexible, closed vessel having a tube or neck or necks for fitting the nipple or nipples of the udder. Preferably, a check valve is located in the tube or neck, or in each tube or neck.

1 designates one form of collapsible vessel which is a rubber sack or tube having a resilient neck 2 for fitting over the nipple of the animal. The vessel may be collapsed by squeezing the walls thereof together in the hand or by being folded or compressed flat or by being rolled from its closed end toward the nipple and held compressed, flattened or rolled until the neck has been placed in the nipple. This vessel may also be provided with means for attachment to the automatic milking machine, so that the vessel serves as a receptacle for the milk instead of the ordinary pail or other vessel in which the milk is now discharged.

In Figs. 3, 4 the vessel is shown as formed with four necks 2 for fitting the four nipples of the cow. However, a collapsible vessel or sack may be used having an open neck large enough to enclose a plurality or all of the nipples and be squeezed or compressed around the nipples when grasped by the hand or anything performing the function of the hand. The necks 2 may be closed by a valve or automatic closure 3 here shown as a flexible tube preferably of soft rubber located in the neck and attached at one end preferably its upper end to the inner wall of the neck and projecting toward the vessel, the projecting portion being shaped and tensioned so that its opposite sides fold flatwise on each other and close the tube 3. When the nipple of the cow is inserted in the neck 2 it passes into the closure tube 3 and separates the collapsed walls thereof. When the neck 2 is detached for the nipple the closure automatically collapses and closes the vessel against the outside air.

The apparatus for emptying the vessel in other vessels as bottles, cans, etc. comprises a coupling 4 insertable in the neck 2 and into the closure tube 3 to open the same, a conduit 5 leading from the coupling and passing through a plug or coupling 6 in the top of the bottle or can 7. The conduit 5 is preferably flexible and provided with a valve as a pinch valve therein.

Any inequality in pressure between the cans or bottle 7 and the vessel 1 especially when the can or bottle is filled with a gas as carbon dioxide gas is equalized through the tube 5 or if necessary two tubes may be provided suitably arranged to conduct the milk and equalize the pressure.

Also, if desired, the vessel may contain $CO_2$ gas so that the milk is discharged from the nipple directly into an atmosphere of $CO_2$ or other preservative or germicidal gas inactive on the milk, and the vessel expands or fills out as the milk fills thereinto.

What I claim is:

1. A milking vessel comprising an expansible and collapsible vessel having a neck for fitting the nipple of the udder and a check valve in the neck.

2. A milking vessel comprising an expansible and collapsible flexible closed vessel having a neck for fitting the nipple of the udder.

3. A milking vessel comprising an expansible and collapsible flexible vessel having a neck for fitting the nipple of the udder and a collapsible valve in the neck arranged to receive and to be opened by the nipple.

4. A milking vessel comprising an expansible and collapsible flexible vessel having a neck for fitting the nipple of the udder, and a collapsible valve in the neck comprising a tube connected at its upper end to the inner face of the neck, the tube projecting toward the vessel and its inner end being shaped and tensioned to collapse and close the tube.

In testimony whereof, I have hereunto signed my name, at Syracuse, in the county of Onondaga, and State of New York, this 8th day of May, 1922.

LUDWIG ALVINE ZOHE.